Patented Nov. 2, 1943

2,333,137

UNITED STATES PATENT OFFICE 2,333,137

ACID WOOL DYESTUFFS

Werner Zerweck and Ernst Heinrich, Frankfort-on-the-Main-Fechenheim, Germany, assignors to General Aniline & Film Corporation, New York, N. Y., a corporation of Delaware No Drawing. Application June 14, 1940, Serial No. 340,547. In Germany July 8, 1939

2 Claims. (Cl. 260—374)

Our present invention relates to acid wool dyestuffs more particularly to those of the general formula:

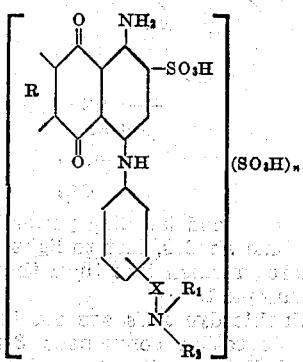

wherein R stands for a radicle of the benzene series, X for a member of the group consisting of alkylene, O-alkylene, S-alkylene, SO-alkylene and $SO_2$-alkylene radicles, $R_1$ and $R_2$ for a member of the group consisting of alkyl and hydroxyalkyl radicles and radicals which, together with the terminal nitrogen, form a heterocyclic radicle, $n$ for a number from 1 to 3.

The process of manufacture of the present new dyestuffs according to one feature of the invention consists in condensing a 1-amino-4-halogen-anthraquinone-2-sulfonic acid with an amine of the general formula:

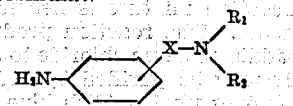

wherein X, $R_1$ and $R_2$ have the aforesaid signification and, if necessary, after treating the condensation product formed with a sulfonating agent.

According to a further feature of the invention dyestuffs of the same class are obtained by condensing a 1-amino-2.4-dihalogen-anthraquinone with an amine of the aforesaid kind and replacing in the molecule of the condensation product the halogen atom standing in the 2-position of the anthraquinone nucleus by the sulfonic acid group.

The present new dyestuffs are distinguished by a particular levelling power and dye wool from an acid bath mostly bluish shades of good fastness properties particularly of a good fastness to light.

In order to further illustrate our invention the following examples are given, the parts being by weight and all temperatures in degrees centigrade.

EXAMPLE 1

(a) Condensation 40 parts of 1-amino-4-bromoanthraquinone-2-sulfonic acid are dissolved in about 3000 parts of water and 1000 parts of alcohol and 12 parts of 4-aminobenzyl-dimethylamine, 40 parts of sodium bicarbonate and 4 parts of cuprous chloride are added. The mixture is heated to boiling for some hours and the reaction product formed is separated by acidification and isolated. It dissolves in concentrated sulfuric acid with a bluish green color turning to yellowish green after the addition of paraformaldehyde.

(b) Sulfonation 30 parts of the aforesaid condensation product are dissolved in a mixture of 150 parts of sulfuric acid monohydrate and 30 parts of fuming sulfuric acid of 20% strength. The reaction mass is heated at 40 to 45° for about 20 hours and then ice is added. The dyestuff solution having a strong mineral acid reaction is then neutralized with a caustic soda lye of 33° Bé., advantageously while cooling. The separated dyestuff is isolated. It corresponds with the formula:

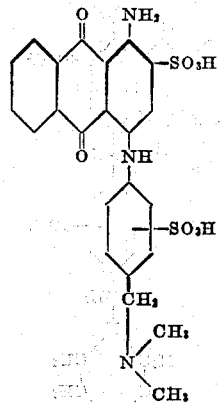

It dissolves in concentrated sulfuric acid with a reddish blue color turning to yellowish green after the addition of paraformaldehyde.

The dyestuff dyes wool reddish blue shades of a good fastness to light and an excellent levelling power.

When replacing the 4-aminobenzyl-dimethylamine by the equivalent amount of 4-aminobenzyl-diethyl-amine, 4-aminobenzyl-hydroxyethylamine, 4-aminobenzyl-dipropylamine of the formula:

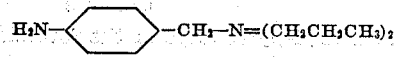

4-aminobenzyl-diiso-butylamine, 4-aminophenethyl-diethylamine of the formula:

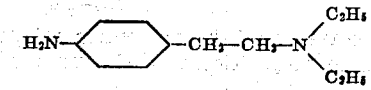

4-aminophenetidyl-diethylamine of the formula:

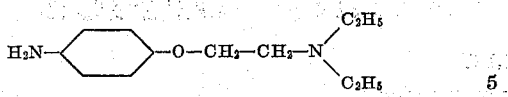

4-aminothiophenetidyl-diethylamine of the formula:

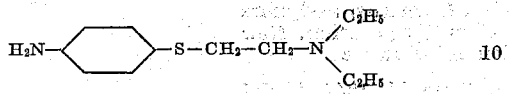

or 4-aminophenyl-(ω - diethylamino) - ethylsulfone of the formula:

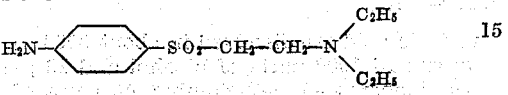

or the corresponding sulfoxide compound or of the corresponding compounds, in the molecule of which the benzene nucleus is substituted in the 2- or 3-position, dyestuffs of similar tinctorial properties are obtained.

EXAMPLE 2

33 parts of 1-amino-4-bromoanthraquinone-2-sulfonic acid are dissolved in a mixture of about 1700 parts of water and 600 parts of alcohol and 24 parts of p-aminobenzyl-morpholine, 33 parts of sodium bicarbonate and 3.3 parts of cuprous chloride are added. The solution is boiled for some hours and the formed condensation product is isolated by acidification. It dissolves in concentrated sulfuric acid with a yellowish green color, which is deepened by the addition of paraformaldehyde.

By a subsequent sulfonation as described in Example 1 a dyestuff of the formula:

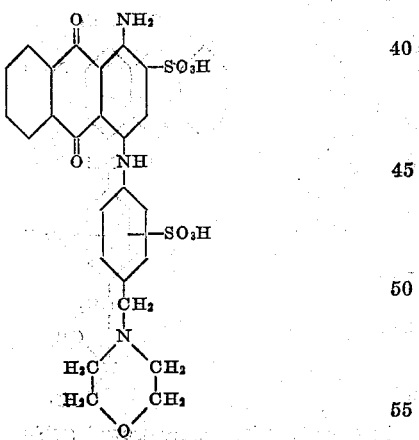

is obtained, dyeing wool clear reddish blue shades of a good fastness to light and having an excellent levelling power.

Dyestuff of similar shade and tinctorial properties are obtained when replacing the p-aminobenzylmorpholine by the equivalent amount of p-amino-benzyl-piperidine of the formula:

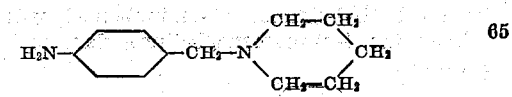

or p-aminobenzyl-pyrrolidine of the formula:

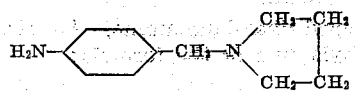

or of the corresponding compounds substituted in ortho- or meta-position of the benzene nucleus.

EXAMPLE 3

100 parts of 1-amino-4-bromoanthraquinone-2-sulfonic acid are dissolved in about 5200 parts of water and a solution of 72 parts of 3-amino-4-methoxy-benzyl-dimethylamine in about 1800 parts of alcohol, 100 parts of sodium bicarbonate and 10 parts of cuprous chloride are added. The mixture is boiled for some hours and the formed condensation product is isolated by acidification.

By a subsequent sulfonation it is converted into a dyestuff of the formula:

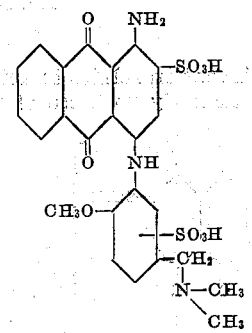

which has a very good levelling power and dyes wool reddish blue shades, fast to light and of a somewhat more greenish tint than those of the dyestuff of Example 1.

Similar valuable dyestuffs are obtained when using as condensation component 3-amino-4-methoxybenzyl-diethylamine, 3 - amino-4-methoxy-benzyl-morpholine, 3 - amino - 4-methoxy-benzyl-pyrrolidine or -piperidine.

Dyestuffs of a more reddish shade are obtained by using 2-amino-6-chloro - benzyl - dimethylamine or -morpholine.

EXAMPLE 4

25 parts of 1-amino-4-bromo-anthraquinone-2-sulfonic acid are dissolved in about 1500 parts of water and 24 parts of m-amino-benzyl-methyltaurine, 25 parts of sodium bicarbonate and 2.5 parts of cuprous chloride are added. Then the reaction mixture is heated to boiling for some hours. The reaction product may be isolated by adding sodium chloride to the filtrated solution. It may be purified by redissolving it in water. It dyes wool reddish blue shades fast to light and has an excellent levelling power.

By a subsequent sulfonation a dyestuff of the formula:

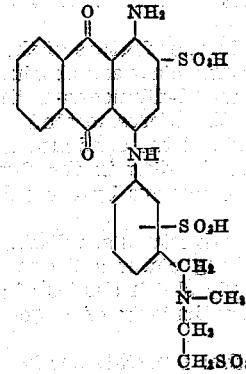

is obtained which has a very good levelling power and dyes wool clear reddish blue shades fast to light.

When using the same amount of o-aminobenzylmethyltaurine the formed dyestuff dyes wool somewhat more reddish shades.

When replacing the 1-amino-4-bromoanthraquinone-2-sulfonic acid by equivalent amount of 1-amino-4-bromo-5-acetylamino- or -5-methoxyacetylamino-anthraquinone-2-sulfonic acid there are obtained dyestuffs dyeing wool somewhat more greenish valuable shades.

EXAMPLE 5

25 parts of 1-amino-4-iodinoanthraquinone-2.6-disulfonic acid are dissolved in about 1500 parts of water and a solution of 15 parts of p-amino-benzyl-dimethyl-amine, 25 parts of sodium carbonate and 2.5 parts of cuprous chloride are added. The mixture is heated some hours to boiling, the formed solution is filtered off and the condensation product is isolated by adding sodium chloride thereto. It may be purified by redissolving it. It dyes wool reddish blue shades fast to light and has an excellent levelling power.

By a subsequent sulfonation a dyestuff is obtained of the formula:

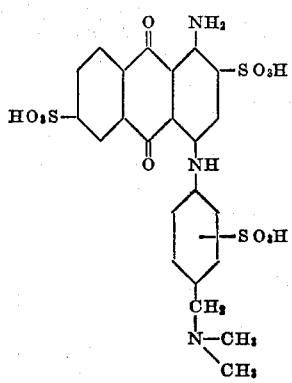

which has a very good levelling power and dyes wool reddish blue shades fast to light.

Dyestuffs of a similar valuable shade are obtained by replacing p-aminobenzyl-dimethylamine by for instance p-amino-benzyldiethylamine, p-amino-phenetidyl-diethylamine, p-amino-benzylmorpholine, p-aminobenzyl-pyrrolidine, p-amino-benzyl-piperidine or p-amino-benzyl-methyl-taurine or the corresponding o- or m-compounds.

We claim:

1. Acid wool dyestuffs of the general formula:

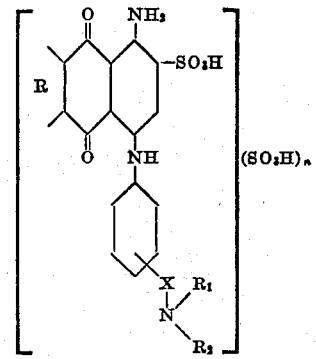

wherein R stands for a radicle of the benzene series, X for alkylene, $R_1$ and $R_2$ for alkyl and $n$ for a number from 1 to 3, said dyestuffs having a good levelling power and dyeing wool from an acid bath bluish shades of a good fastness, particularly to light.

2. An acid wool dyestuff of the formula:

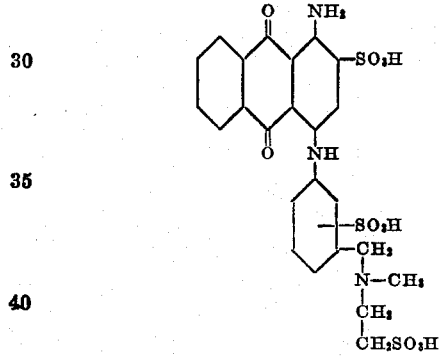

which dyestuff has a good levelling power and dyes wool clear reddish blue shades fast to light.

WERNER ZERWECK.
ERNST HEINRICH.